Sept. 3, 1957 C. W. CLARK, SR 2,804,769
HARDNESS TESTER WORK PIECE CLAMPING MEANS
Filed July 29, 1955
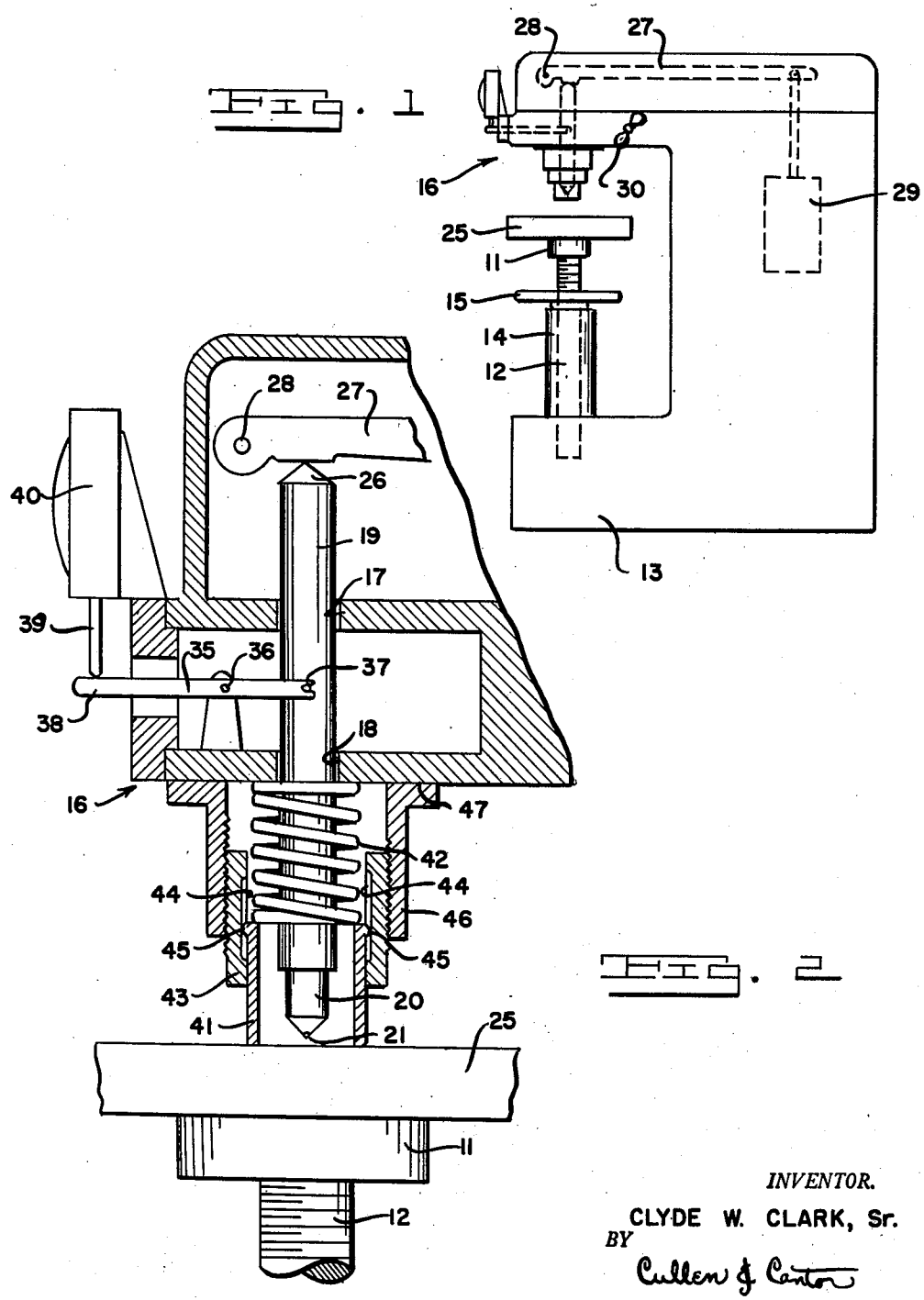
INVENTOR.
CLYDE W. CLARK, Sr.
BY
Cullen & Canton
ATTORNEYS

2,804,769

HARDNESS TESTER WORK PIECE CLAMPING MEANS

Clyde W. Clark, Sr., Dearborn, Mich., assignor to Clark Instrument Company, Dearborn, Mich.

Application July 29, 1955, Serial No. 525,295

1 Claim. (Cl. 73—81)

This invention relates to a hardness tester work piece clamping means and more particularly to a means for both protecting the penetrator point of a hardness testing machine and for clamping the work-piece while the work-piece is being tested.

The conventional hardness testing machines are formed with a large C-shaped frame and are provided with a work-piece holding anvil at the lower part of the C and a spindle at the head or upper part of the C directly above and in alignment with the work-piece. The end of the spindle is normally provided with a diamond or some such similarly hard material as a penetrating point. When it is desired to test a work-piece, the penetrator point through the spindle is provided with a minor load which causes the point to penetrate the work-piece. Thereafter, a major load is applied to the spindle and upon the application of this major load, the depth of penetration of the point into the work-piece is measured and converted into a relative hardness scale. Conventional type scales, normally used are the so-called Brinell and Rockwell Hardness Testing Scales.

There are three major problems which arise in the use of these conventional hardness testing machines and it is, therefore, the object of my invention to solve each of these problems.

The first problem is that where a work-piece to be tested is formed in some odd curved surface shape it is extremely difficult to hold this work piece upon the testing anvil during the test operation. To test such an odd shaped piece requires an unusually large amount of labor, which obviously is quite costly. Where production testing is being carried out, such excess use of labor becomes prohibitive in cost.

The second problem is that since the penetrator point projects only a short distance away from the anvil, it is frequently struck by the work-piece while the operator is inserting the work-piece between the anvil and penetrator point. The diamond material or the similar type hard material used for the penetrator point is thus frequently damaged and rendered useless. In such a situation, the new point which must be used to replace the damaged point is quite expensive and moreover, it takes a great deal of time to replace these points.

The third problem encountered is that the frame, which is C shaped, of the testing machine has a certain degree of inherent elasticity. Thus, when the penetrator point is pressed against the anvil, the C shaped frame tends to spring apart a short distance and after the test, resiliently returns to the unloaded position. The cause of this springing effect appears to be the inherent resiliency in the cast metal materials used for the casing and frame of the machine.

My invention solves and eliminates each one of the above problems by providing a means which normally extends beyond the penetrator point toward the anvil to grasp a work-piece before and during the time that the load is applied to the spindle. This means is curved, if necessary, to fit the contours of a work-piece. Likewise, where the work-piece has two curved surfaces the anvil is also provided with a contoured surface to receive the surface contours of the work-piece. The clamping means normally surrounds the penetrator tip when the machine is inoperative so as to protect the tip from damage. However, when a test is being run the clamping means is so mounted that it may be moved out of the way of the penetrator tip so that the penetrator tip may enter the work-piece surface.

In addition, my invention provides a means which preloads and pre-stresses the C shaped frame of the hardness tester to cause the frame to spring before the work-piece penetrating tip becomes operative. In this manner, the spring of the frame is not included in the measuring of the relative depth of penetration and the relative hardness of a work-piece and a more accurate reading is thereby obtained.

The means which I employ to carry forth my objectives may take various forms, however, basically it consists of a collar which normally surrounds the penetrator tip and which is spring mounted to the top or head of the C shaped frame for movement toward and away from said top or head. This collar may have a work-piece contacting surface which is contoured and formed to receive odd shaped work-pieces.

When operating a hardness tester equipped with my novel clamping means, the work-piece is first placed upon the anvil and then the anvil is raised to cause the work-piece to move toward the penetrator point and said point to penetrate the work-piece surface under a so-called minor load. During the movement of the work-piece toward the penetrator point the work-piece surface first contacts the clamping means which rigidly grasps the work-piece to prevent it from moving out of position. Thereafter, further movement causes the clamping means to move against the resistance of the resilient mounting toward the top or head of the testing machine until it clears the penetrator point which pierces the surface of the work-piece.

The force applied during the minor load to move the clamping means both causes the clamping means to rigidly grip the work-piece and also causes the force to be transmitted to the frame of the testing machine to thereby spring the machine before the penetrator point actually sinks into the work-piece surface.

Other objects and advantages of this invention will become apparent upon reading the following specification of which the attached drawings form a part.

Referring to the drawings in which:

Fig. 1 illustrates a plan view of a conventional hardness testing machine which is equipped with my novel clamping means.

Fig. 2 is a cross-sectional view of a portion of the hardness testing machine and shows a first modification for carrying out my objectives.

Illustrated in Fig. 1 is a conventional hardness machine having a C shaped frame 10 which may be formed of cast iron or of cast parts which are welded together. The construction of this frame forms no part of this invention and therefore will not be described in detail.

A work-piece supporting anvil 11 is provided to be adjustable upwards and downwards from the base 13 of the frame by means of a threaded screw 12 connected to the anvil. The screw is mounted within a cylindrical housing and a hand adjustment wheel 15 is provided to threadedly move the screw upwards and downwards. This structure is all conventional and may be found in various similar forms upon the conventional machines now on the market.

The top or head 16 of the machine is formed with a pair of aligned bores 17 and 18 through which the work-piece testing spindle 19 is slidably inserted. This spindle has a lower end 20 fitted with a penetrator point 21 formed of diamond or steel or the like (see Fig. 2).

To operate this conventional machine, the work-piece 25 is placed upon an anvil 12 and then the anvil is raised until the penetrator point 21 pierces the surface of the work-piece. This movement of the work-piece toward the penetrator point by means of moving the anvil provides the minor load which is the initial load applied before the actual test is run. Thereafter, a major load is applied to the top of the spindle 26 by means of an arm 27 pivoted to the frame at 28 and placed under a load by means of weights 29 (see Fig. 1). Normally a tripping mechanism is supplied on these machines to trip the major load weights to thereby apply the major load to the spindle and force the spindle downward into the work-piece. In Fig. 1 there is illustrated a handle 30 which operates the tripping mechanism. However, this mechanism is not further shown since it forms no part of the invention.

When the spindle moves downward into the work-piece under the major load, a lever 35 pivoted to the frame at 36 and loosely interconnected with the spindle at 37 swings downwardly at 37 with the spindle and upwardly at its opposite end 38 to cause an indicator dial plunger 39 to move upwardly and thereby cause a reading on the face of a standard dial indicator 40. This reading may be shown in terms of depth of penetration or, more commonly, as a Brinell or a Rockwell hardness reading.

All the above structure is well known and is described merely to set forth the environment of my invention.

Referring to Fig. 2 again, the work-piece clamping means consists of a collar 41 which surrounds the lower end of the spindle and the penetrator point 21. This collar is spring biased away from the top or head of the machine frame by means of a coil spring 42 which, in this case, surrounds the spindle. A collar retaining means in the form of a tube 43 surrounds the collar and is provided with grooves 44 within which protuberances 45 formed on the collar, ride. The coaction between the protuberances and the grooves prevent the collar from moving too far away from the head or from becoming loose and disengaged from its proper position.

In order to adjust the spring tension, the tube 43 is threadedly inter-engaged with an outer annular flange member 46 which is rigidly secured to the head of the machine as shown at 47 in the drawings. To tighten the spring, the tube is threaded upwardly into the flange member 46.

The collar 41 functions, in operation, to press against the work-piece when the anvil is being moved toward the penetrator point to apply the minor load. The collar, thus, is forced upward toward the head of the machine and the load which is transmitted through the compression spring causes the machine frame to spring or yield to take up its inherent resilient slack. Thereafter, the collar clears the penetrator point which pierces the work-piece and rigidly clamps it in position during the test so that the work-piece may not slip off the anvil or slip out of position.

This invention may be further developed within the scope of the following claim without departing from the essential features thereof. Accordingly, it is desired that the foregoing specification be read as being merely illustrative of several operative embodiments of my invention and not in strictly a limiting sense.

I claim:

A hardness tester work piece clamping means comprising a head, a load applying spindle mounted on said head and extending therefrom and having a work piece contacting end, a work piece supporting anvil in alignment with the spindle, a work piece clamping member formed of a cylindrical body having a flange secured to the head and having an opening through which the spindle may pass to contact the surface of a work piece, said member also having therein a telescoping collar having an edge normally spaced from said head a greater distance than the spindle work piece contacting end, said edge being formed to cooperate with the anvil to clamp a work piece against it, and a compression spring inside the body and bearing against the head and collar to urge the collar away from the head.

References Cited in the file of this patent

UNITED STATES PATENTS

| | | |
|---|---|---|
| 177,067 | Hobbs | May 9, 1876 |
| 1,806,767 | Shore | May 26, 1931 |
| 1,890,923 | Wilson | Dec. 13, 1932 |
| 1,937,115 | Hayford | Nov. 28, 1933 |
| 2,579,641 | Aldrich | Dec. 25, 1951 |
| 2,670,795 | Griep | Mar. 2, 1954 |